(12) United States Patent  
Huang

(10) Patent No.: US 7,576,894 B2  
(45) Date of Patent: Aug. 18, 2009

(54) DEVICE AND METHOD FOR SHARPENING IMAGE SIGNAL

(75) Inventor: Kuowei Huang, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 610 days.

(21) Appl. No.: 11/307,622

(22) Filed: Feb. 15, 2006

(65) Prior Publication Data

US 2007/0070428 A1    Mar. 29, 2007

(30) Foreign Application Priority Data

Sep. 20, 2005    (TW) .............................. 94132410 A

(51) Int. Cl.
- *G06T 5/00* (2006.01)
- *G06K 15/00* (2006.01)
- *H04N 1/46* (2006.01)
- *G06K 9/40* (2006.01)

(52) U.S. Cl. ...................... 358/3.27; 358/2.1; 358/3.15; 358/532; 382/254; 382/199; 382/266

(58) Field of Classification Search .................. 358/2.1, 358/3.15, 3.27, 532; 382/199, 254, 266
See application file for complete search history.

(56) References Cited

U.S. PATENT DOCUMENTS

| 5,926,578 | A   | * | 7/1999  | Fukase et al. ............... 382/266 |
| 5,936,682 | A   |   | 8/1999  | Thomas et al. ............. 348/625 |
| 6,690,429 | B1  | * | 2/2004  | Kim ........................... 348/625 |
| 6,873,741 | B2  | * | 3/2005  | Li .............................. 382/266 |
| 2004/0223662 | A1 | * | 11/2004 | Urano et al. ................ 382/299 |

* cited by examiner

*Primary Examiner*—King Y Poon  
*Assistant Examiner*—Javier Segura  
(74) *Attorney, Agent, or Firm*—Jianq Chyun IP Office

(57) ABSTRACT

A device for sharpening an image signal for receiving an image signal input, detecting and sharpening the object edge of the image signal input by using a detection period, and outputting an image signal output is provided. The image signal sharpening device determines the switching point of a maximum value signal and of a minimum value signal within the detection period through a switch-point generator and sharpens the image signal input through a signal processing unit. Therefore, the device can enhance the contrast of the edge of the object image and improve image sharpness without causing an overshoots or undershoots of the image amplitude. In addition, a confidence checking unit can be used to ensure the correct detection of the edge of the object image.

14 Claims, 3 Drawing Sheets

DEVICE AND METHOD FOR SHARPENING IMAGE SIGNAL

CROSS-REFERENCE TO RELATED APPLICATION

This application claims the priority benefit of Taiwan application serial no. 941 32410, filed on Sep. 20, 2005. All disclosure of the Taiwan application is incorporated herein by reference.

BACKGROUND OF THE INVENTION

1. Field of the Invention

The present invention relates to a method of processing image signal. More particularly, the present invention relates to a device and method for sharpening an image signal.

2. Description of the Related Art

Due to factors such as limited bandwidth or inferior image processing treatment in the current signal transmission standard or image signal processing scheme, the image object often has blurry edges or insufficiently sharpened demarcation lines. To improve the quality of the received images or to enhance the contrast of the received images, a technique capable of enhancing the transient at the edge of an image object has been developed so that the image object is able to have a sharper boundary.

One important factor for increasing the sharpness of an image is to enhance the contrast such as luma or chroma on each side of the edge of an image object. However, the enhancing method must follow certain conditions, or else some other problems will arise. For example, the luma or chroma signal after enhancement must maintain the relative position of the original image signal. Furthermore, the signal amplitude must not overshoot or undershoot when compared with the original image signal amplitude. Obviously, an acceptable quality level must be maintained after the image is enhanced.

In U.S. Pat. No. 5,936,682, a method of sharpening the image is disclosed. Because a finite impulse response (FIR) filter is used, the amplitude of the enhanced image sometimes overshoots as well as undershoots. To eliminate the overshoot or undershoot of the amplitude of the enhanced image, additional circuitry is required to process the signal. Ultimately, sharpening the image will incur additional cost.

SUMMARY OF THE INVENTION

Accordingly, at least one objective of the present invention is to provide a device and method for sharpening an image signal through enhancing the contrast on the transient of an edge of an image object. Thus, the sharpness of the image is improved.

To achieve these and other advantages and in accordance with the purpose of the invention, as embodied and broadly described herein, the invention provides an image signal sharpening device for receiving an image signal input, detecting and sharpening the object edge of the image signal input by using a detection window, and outputting an image signal output. The detection window samples the image signal within a detection period to generate n sample points. Here, n is a positive integer. The image signal sharpening device comprises an object edge maximizing unit, an object edge minimizing unit, a switch-point generator, a signal processing unit, a confidence checking unit and a selection device.

The object edge maximizing unit is a maximum value filter, the object edge minimizing unit is a minimum value filter and the selection device is a multiplexer, for example.

The object edge maximizing unit is used for finding the largest value among the first sampled point, the middle sample point and the $n^{th}$ sample point sampled from the detection window and outputting the largest signal value. The object edge minimizing unit is used for finding the smallest value among the first sampled point, the middle sample point and the nth sample point sampled from the detection window and outputting the smallest signal value. According to the image signal input, the switch-point generator outputs a switch-point signal to determine the locations in the detection window for switching to the maximum value signal and the minimum value signal. Then, according to the maximum value signal, the minimum value signal and the switch-point signal, the signal processing unit performs a sharpening treatment on the image signal input. Then, according to the maximum value signal, the minimum value signal and the switch-point signal, the confidence checking unit determines the correctness of the object edge detection so that a selected signal is output. Finally, according to the selected signal, the selection device either outputs the output from the signal processing unit or the image signal input.

Accordingly, the present invention uses a switch-point generator to determine the locations for switching to the maximum value signal and to the minimum value signal in the detection window; and a signal processing unit to perform an image sharpening treatment. Hence, the contrast on either side of the object edge can be enhanced to improve the sharpness of the image without causing any overshoots or undershoots of the image signal amplitude. Furthermore, a confidence checking unit is deployed to ensure the correctness of the object edge detection.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
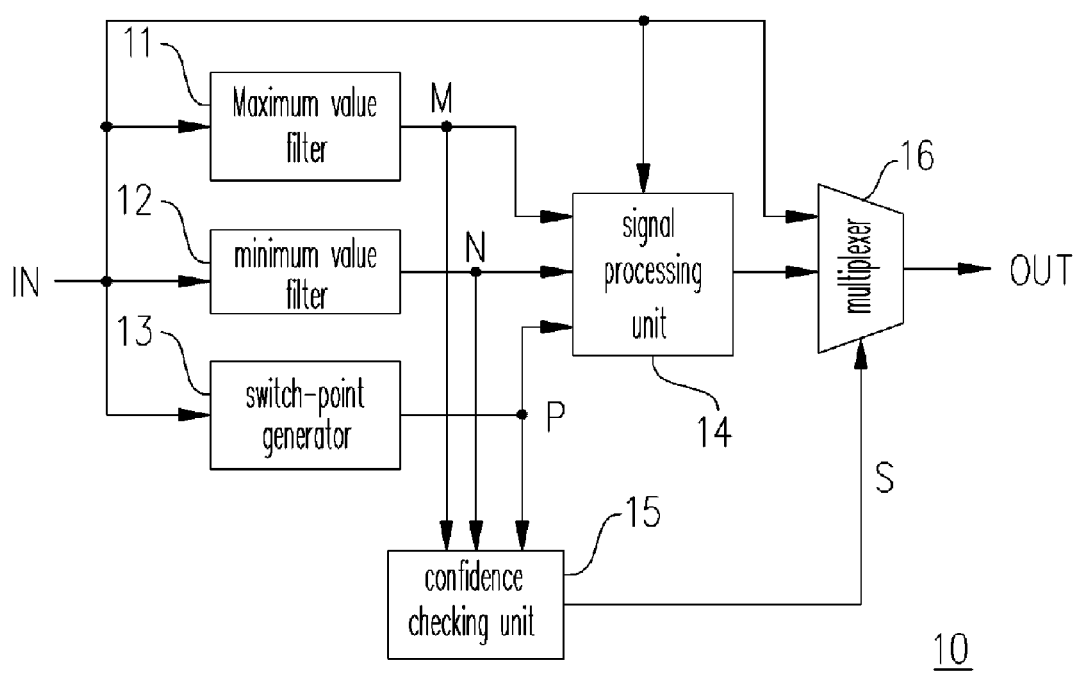
FIG. 1 is a block diagram showing the components of an image signal sharpening device according to one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

To facilitate the following description, the object edge maximizing unit is a maximum value filter and the object edge minimizing unit is a minimum value filter, the selection device is a multiplexer, and the image input signal is a saturation/brightness signal, for example.

Figure 2:
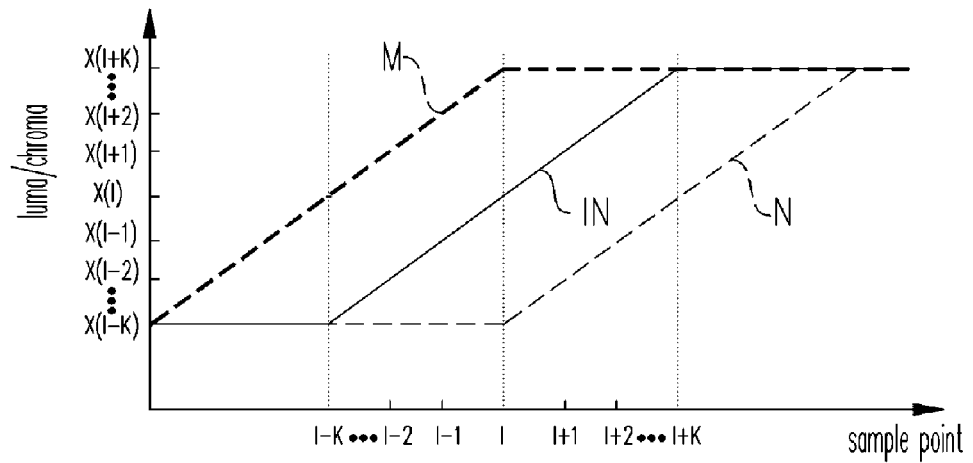
FIG. 2 is a graph showing the waveform of the image signal input, the maximum value signal and the minimum value signal of the device in FIG. 1.

FIG. 1 is a block diagram showing the components of an image signal sharpening device according to one preferred embodiment of the present invention. FIG. 2 is a graph showing the waveform of the image input signal, the maximum value signal and the minimum value signal of the device in FIG. 1. As shown in FIGS. 1 and 2, the image signal sharpening device 10 includes a maximum value filter 11, a minimum value filter 12, a switch-point generator 13, a signal processing unit 14, a confidence checking unit 15 and a multiplexer 16.

The maximum value filter 11, the minimum value filter 12 and the switch-point generator 13 all receive an image signal input IN and sample from a window of the image signal input IN using a detection period to produce n sampled points. As shown in FIG. 2, the location I−K is the first sample point whose value is X(I−K); the location I+K is the $N^{th}$ sample point whose value is X(I+K); and the location I is the middle sample point or the $[(n+1)/2]^{th}$ sample point whose value is X(I). Obviously, n is an odd number. Obviously, n can be an even number, in this case, the middle sample point is selected from the group consisting of the $(n/2)^{th}$ sample point, and the $[(n/2)+1]^{th}$ sampled point. Thus, the aforementioned detection period is the detection period from the first to the nth sample point. Furthermore, the length of the detection period and the number of sample points can be designed according to the actual need.

The image signal sharpening device 10 utilizes the detection period to sample the image signal input IN that is continuously inputted. In other words, the image signal input IN is continuously fed into the detection period and sampled. The detection period can be implemented using a plurality of delay devices serially connected together. Furthermore, the output from each delay device is one of the sample points and the distance of separation between neighboring sample points is determined by the delay period of the delay device.

As shown in FIGS. 1 and 2, the maximum value among the first sample point, the middle sample point and the $n^{th}$ sample point (the maximum value among the three values X(I−K), X(I) and X(I+K)) sampled from the detection period by the maximum value filter 11 is selected to output a maximum value signal M. Similarly, the minimum value among the first sample point, the middle sample point and the $n^{th}$ sample point (the minimum value among the three values X(I−K), X(I) and X(I+K)) sampled from the detection period by the minimum value filter 12 is selected to output a minimum value signal N. According to the image signal input IN, the switch-point generator outputs a switch-point signal P to determine whether to switch the locations of the maximum value signal M and the minimum value signal N within the detection period or not. For different application purpose the switching location can be adjusted within the transient period of the image object edge. In general, the switching location is designed to be located at the middle sample point, that is, the location 1.

If the waveform of the image signal input IN is as shown in FIG. 2, the first sample point has the smallest value and the nth sample point has the largest value within the detection period. The maximum value signal M and the minimum value signal N are as indicated in the FIG. 2.

Figure 3:
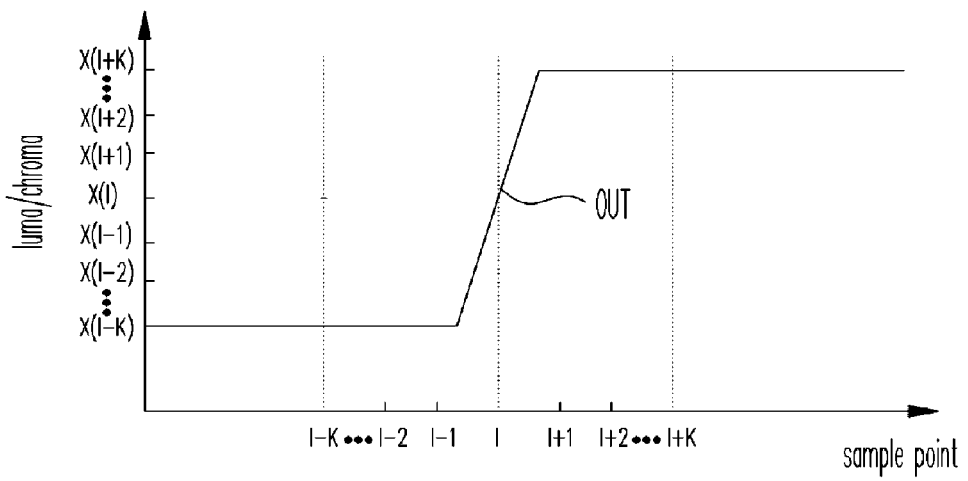
FIG. 3 is a graph showing the waveform of the image output signal of the device in FIG. 1.

According to the maximum value signal M, the minimum value signal N and the switch-point signal P, the signal processing unit 14 performs a sharpening treatment on the image signal input IN. For example, if the waveform of the image signal input IN is as the one shown in FIG. 2, the signal processing unit 14 will switch the maximum value signal M and the minimum value signal N of the image signal input IN according to the switch point indicated by the switch-point signal P to obtain the signal waveform shown in FIG. 3. As shown in FIG. 3, the waveform can be regarded as enhancing the luma/chroma image signal after switch location by the maximum value filter 11 and reduce the luma/chroma image signal before switch location by the minimum value filter 12. Through these properties, the contrast of the brightness or saturation on either side of the image edge is enhanced. If the confidence checking unit 150 can ensure the correctness of the object edge of the detected image signal input IN, the output from the signal processing unit 14 is output through the multiplexer 16 as shown in FIG. 1.

According to the maximum value signal M, the minimum value signal N and the switch-point signal P, the confidence checking unit 15 determines if the object edge of the image signal input IN is detected or not and outputs a selection signal S to the multiplexer 16 accordingly. If the selection signal S indicates that it has detected the object edge of the image signal input IN, the multiplexer 16 chooses to output the sharpening processing signal from the signal processing unit 14. Conversely, if the selection signal S indicates the non-detection of the object edge of the image input IN signal, the multiplexer 16 chooses to output the unprocessed image output signal IN.

For example, the confidence checking unit 15 can compare a difference between the maximum value signal M and the minimum value signal N (that is |M−N|) with a first threshold value Th to determine if the object edge of the image signal input has been detected or not. When |M−N|>Th, that is, the difference between the maximum value signal M and the minimum value signal N is at least as much as the threshold value Th, the object edge exists. Obviously, other inspection method can be used. For example, the average value between the maximum value signal M and the minimum value signal N can be compared with the image signal input IN, the detailed of which is not described here.

Figure 4:
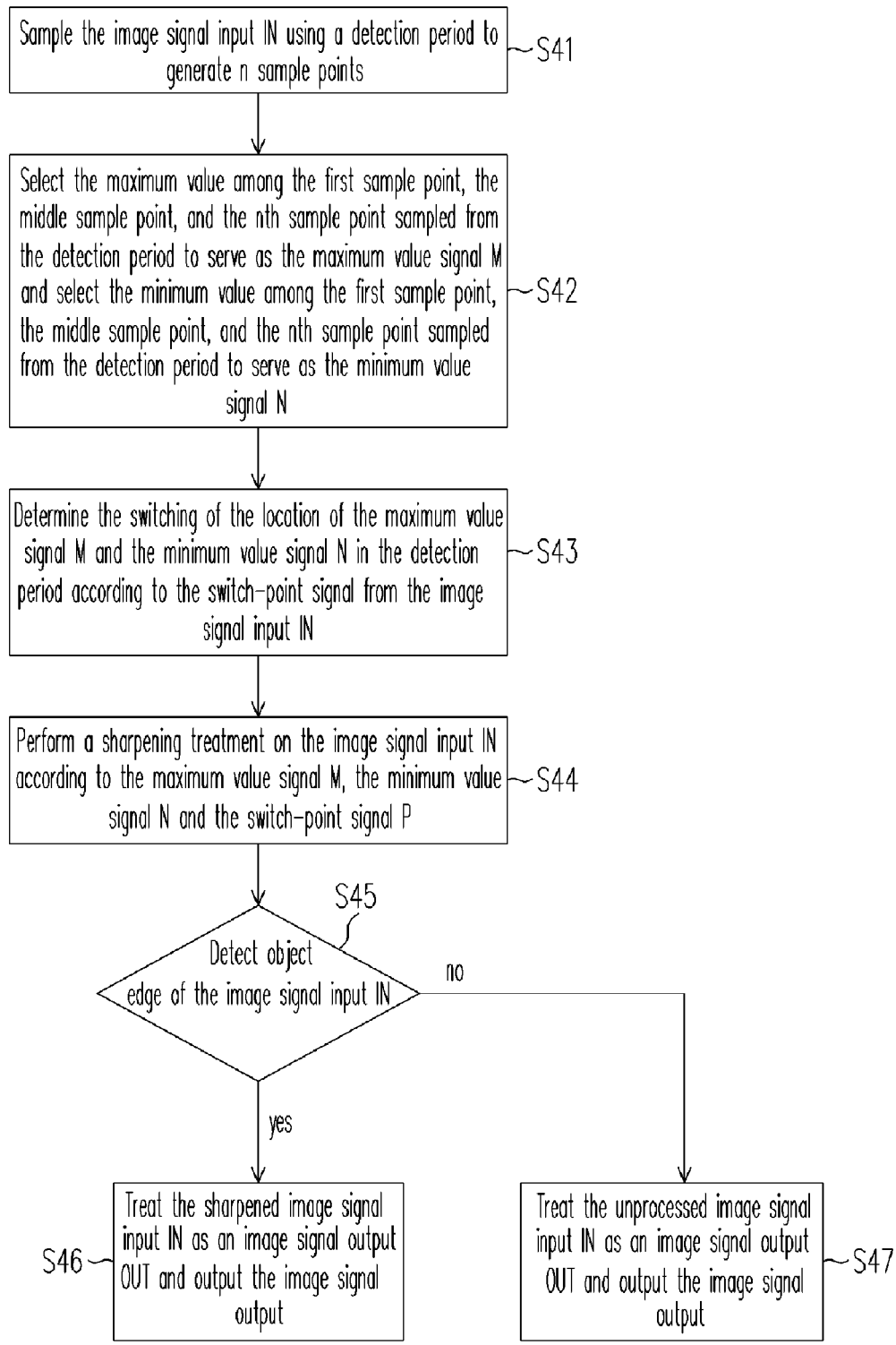
FIG. 4 is a flow diagram showing the steps for sharpening the image signal according to one preferred embodiment of the present invention.

FIG. 4 is a flow diagram showing the steps for sharpening the image signal according to one preferred embodiment of the present invention. For a clearer explanation, the steps in FIG. 4 are described with reference to the block diagram in FIG. 1. As shown in FIGS. 1 and 4, a period of the image signal input IN is sampled using the detection period to generate n sample points in step S41. Here, n is a positive integer. Then, in step S42, from a sampled first sample point, a middle sample point and an nth sample point sampled by the detection period, the maximum value filter 11 selects the maximum value to serve as the maximum value signal M and output that signal. Similarly, the minimum value filter 12 selects the minimum value to serve as the minimum value signal N and output that signal.

In step S43, according to the image signal input IN, the switch-point generator 13 sends out a switch-point signal P to determine the switching of the location of the maximum value signal M and the minimum value signal N in the detection period. In general, the switching location is designed to be in the middle sample point. In step S44, according to the maximum value signal M, the minimum value signal and the switch-point signal P, the signal processing unit 14 performs a sharpening treatment on the image signal input IN to enhance the brightness or the saturation contrast on each side of the image edge.

In step S45, according to the maximum value signal M, the minimum value signal and the switch-point signal P, the confidence checking unit 15 determines if the object edge of image signal input IN has been detected or not. When the detection of the object edge has been confirmed, the multiplexer 16 treats the image signal input IN processed by the signal processing unit 14 as an image signal output OUT and outputs the signal in step S46. Conversely, the multiplexer 16 treats the unprocessed image signal input IN as an image signal output OUT and outputs the signal in step S47.

In summary, the present invention uses a switch-point generator to determine the locations for switching to the maximum value signal and to the minimum value signal in the detection period; and then a signal processing unit to perform an image sharpening treatment. Hence, the contrast on either side of the object edge can be enhanced to improve the sharpness of the image without causing any overshoots or undershoots of the image amplitude. Furthermore, a confidence checking unit is deployed to ensure the correctness of the object edge detection.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image signal sharpening device for receiving an image signal input, performing a sharpening treatment using the data sampled from the object edge of the image signal input through a detection window and then outputting an image signal output, wherein a detection period is sampled from a detection window of the image signal input to produce n sample points wherein n is a positive integer, the device comprising:
    an object edge maximizing unit for selecting the largest value among a first sample point, a middle sample point, and an $n^{th}$ sample point sampled within the detection window and outputting a maximum value signal;
    an object edge minimizing unit for selecting the smallest value among a first sample point, a middle sample point, and an $n^{th}$ sample point sampled within the detection window and outputting a minimum value signal;
    a switch-point generator for determining the locations of the maximum value signal and the minimum value signal within the detection window according to a switch-point signal output based on the image signal input;
    a signal processing unit for sharpening the image signal input according to the maximum value signal, the minimum value signal, and the switch-point signal;
    a confidence checking unit for determining the correctness of the detected object edge of the image signal input according to the maximum value signal, the minimum value signal, and the switch-point signal, and then outputting a selection signal; and
    a selection device for outputting either the output from the signal processing unit or the image signal input according to the selection signal,
    wherein the middle sample point is the $[(n+1)/2]^{th}$ sample point if n is an odd number.

2. The image signal sharpening device of claim 1, wherein the image signal input includes at least a brightness signal or a saturation signal.

3. The image signal sharpening device of claim 1, wherein the image signal input is either an analogue signal or a digital signal.

4. The image signal sharpening device of claim 1, wherein the middle sample point is selected from the group consisting of $(n/2)^{th}$ sample point, $[(n/2)+1]^{th}$ sample point if n is an even number.

5. The image signal sharpening device of claim 1, wherein the object edge maximizing unit includes a maximum value filter.

6. The image signal sharpening device of claim 1, wherein the object edge minimizing unit includes a minimum value filter.

7. The image signal sharpening device of claim 1, wherein the confidence checking unit determines the correctness of the object edge of the image signal input by comparing the difference between the maximum value signal and the minimum value signal with a first threshold value.

8. The image signal sharpening device of claim 1, wherein the selection device includes a multiplexer.

9. A method for sharpening an image signal, comprising:
    sampling a window of an image signal input using a detection window to produce n sample points, wherein n is a positive integer;
    selecting the largest value among a first sample point, a middle sample point, and an $n^{th}$ sample point sampled from the detection window to serve as a maximum value signal and the smallest value among the first sample point, the middle sample point, and the $n^{th}$ sample point sampled from the detection window to serve as a minimum value signal;
    determining the locations for switching the maximum value signal and the minimum value signal within the detection window according to a switch-point signal based on the image signal input;
    performing a sharpening treatment on the image signal input according to the maximum value signal, the minimum value signal, and the switch-point signal;
    determining the correctness of the object edge of the image signal input according to the maximum value signal, the minimum value signal, and the switch-point signal; and
    using the image signal input that is sharpened as an image signal output when the object edge of the image signal input is detected and then outputting the image signal output,
    wherein the middle sample point is the $[(n+1)/2]^{th}$ sample point if n is an odd number.

10. The method of claim 9, wherein the image signal sharpening process further includes using the image signal input as the image signal output when the object edge of the image signal input is not detected and then outputting the image signal output.

11. The method of claim 9, wherein the image signal input includes at least either a brightness signal or a saturation signal.

12. The method of claim 9, wherein the image signal input is either an analogue signal or a digital signal.

13. The method of claim 9, wherein the middle sample point is selected from the group consisting of $(n/2)^{th}$ sample point, $[(n/2)+1]^{th}$ sample point if n is an even number.

14. The method of claim 9, wherein the confidence checking unit determines the correctness of the object edge of the image signal input by comparing the difference between the maximum value signal and the minimum value signal with a first threshold value.

* * * * *